United States Patent
Grobert

(10) Patent No.: US 7,440,988 B2
(45) Date of Patent: Oct. 21, 2008

(54) SYSTEM AND METHOD FOR DYNAMIC WEIGHT PROCESSING

(75) Inventor: Paul H. Grobert, Granada Hills, CA (US)

(73) Assignee: Raytheon Company, Waltham, MA (US)

( * ) Notice: Subject to any disclaimer, the term of this patent is extended or adjusted under 35 U.S.C. 154(b) by 854 days.

(21) Appl. No.: 10/821,102

(22) Filed: Apr. 8, 2004

(65) Prior Publication Data

US 2005/0228841 A1 Oct. 13, 2005

(51) Int. Cl.
*G06F 17/10* (2006.01)
(52) U.S. Cl. ..................................... 708/300
(58) Field of Classification Search .................. 708/300
See application file for complete search history.

(56) References Cited

U.S. PATENT DOCUMENTS

| | | | |
|---|---|---|---|
| 4,734,701 A | 3/1988 | Grobert | |
| 5,317,322 A | 5/1994 | Grobert | |
| 5,694,416 A | 12/1997 | Johnson et al. | |
| 6,130,643 A | 10/2000 | Trippett et al. | |
| 6,201,843 B1 * | 3/2001 | Kingston et al. | 375/350 |
| 6,327,298 B1 | 12/2001 | Grobert | |
| 6,430,216 B1 * | 8/2002 | Kober et al. | 375/148 |
| 6,727,846 B1 * | 4/2004 | Brown | 342/357.06 |
| 7,092,690 B2 * | 8/2006 | Zancewicz | 455/273 |

(Continued)

FOREIGN PATENT DOCUMENTS

EP  0 599 553 A  6/1994

OTHER PUBLICATIONS

Hatke G. F. ED, Mattthews M.B., "Adaptive array processing for wideband nulling in GPS systems," Signals, Systems and Computers, 1998. Conference Record Of The thirty-Second ASILOMAR Conference, IEEE, vol. 1.2, Nov. 1, 1998, pp. 1332-1336

(Continued)

*Primary Examiner*—David H Malzahn
(74) *Attorney, Agent, or Firm*—Leonard Alkov

(57) ABSTRACT

A dynamic weight generator. The inventive generator includes a first memory for storing a PN code; a second memory for storing a plurality of weights, the second memory being coupled to the first memory whereby data output by the first memory is used to address data stored in the second memory; and a correlator for multiplying an input signal by data output by the second memory. In the illustrative embodiment, the weights are finite impulse response filter correlation coefficients. The correlator includes two multipliers. The first of the multipliers is coupled to a source of an in-phase component of the input signal. The second of the multipliers is coupled to a source of a quadrature component of the input signal. The outputs of the multipliers are summed. In the illustrative application, the input signal is a GPS signal. For this application, the inventive teachings are implemented in a signal processing system adapted to receive a GPS signal and provide in-phase and quadrature signals in response thereto. The signal is filtered with a finite impulse response filter to provided weighted signals. The weighted signals are processed to generate nulling and beamsteering weights for the weighted signals. The weights may be used to equalize the received signals. In a more specific implementation, the received signals are partitioned into space frequency adaptive processing bands and space time adaptive processing is performed within the SFAP bands.

14 Claims, 14 Drawing Sheets

U.S. PATENT DOCUMENTS

2002/0012387 A1* 1/2002 Shakeri et al. ............. 375/150
2002/0071384 A1* 6/2002 Hall et al. .................. 370/203
2004/0001554 A1* 1/2004 Sun et al. ................... 375/260

OTHER PUBLICATIONS

Kegu Yang et al, "Sectorized space-time adaptive processing for CDMA systems," Statistical Signal and Array Processing, 2000. Proceedings of the Tenth IEEE Workshop, IEEE, Aug. 14, 2000, pp. 28-32.

Drs. James Ward and Stephen Kogon, Tutorial 1.2 Space-Time Adaptive Processing for AMTI and GMTI Radar, 2004 IEEE Radar Conference, Innovative Radar Technologies-Expanding System Capabilities, Apr. 26-29, 2004.

James K. Day and Dr. Ravi Adve, Session 8 Space-Time Adaptive Processing II, 2004 IEEE Radar Conference, Innovative Radar Technologies-Expanding System Capabilities, Apr. 26-29, 2004.

* cited by examiner

SYSTEM AND METHOD FOR DYNAMIC WEIGHT PROCESSING

BACKGROUND OF THE INVENTION

1. Field of the Invention

The present invention relates to electrical and electronic systems and methods. More specifically, the present invention relates to systems and methods for processing GPS and other signals.

2. Description of the Related Art

The Global Positioning System (GPS) is a network of satellites that transmits information in signals, which when received and decoded, allow a receiver to accurately fix its position within a coverage area. For military applications, GPS allows self-guided weapons to find targets with heretofore unknown degrees of accuracy.

The GPS is inherently vulnerable to inadvertent and overt jamming and spoofing, necessitating the need to provide additional jamming and prevention techniques to enhanced the robustness of this system. A large number of anti-jam processing techniques have been developed for GPS receivers ranging from excision filters to analog adaptive processing and digital adaptive processing techniques. Generally, these techniques have a number of shortcomings that drive performance, cost, power, and size that make them less attractive for advanced weapon systems.

For example, excision filters and analog adaptive processing anti-jam GPS designs are limited in the number and type (wideband, narrowband, pulse, etc.) of jammers that may be handled.

To overcome the shortcomings of these techniques, the use of Space Frequency Adaptive Processing (SFAP) and Space Time Adaptive Processing (STAP) have emerged as promising candidate anti-jam technologies for GPS. However, these approaches also have a shortcoming in that both require the use of precisely matched antenna elements, diplexer channel, RF downconverter channels, RF and IF filters, which increases system cost and limits performance over the wide temperature ranges experienced by weapon systems.

Hence, a need remains in the art for a system or method for enhancing the robustness of GPS. Specifically, a need remains in the art for a system or method for reducing the vulnerability of GPS to inadvertent and overt jamming and spoofing.

SUMMARY OF THE INVENTION

The need in the art is addressed by the dynamic weight generator of the present invention. The inventive generator includes a first memory for storing a PN code; a second memory for storing a plurality of weights, the second memory being coupled to the first memory whereby data output by the first memory is used to address data stored in the second memory; and a correlator for multiplying an input signal by data output by the second memory.

In the illustrative embodiment, the weights are finite impulse response correlation coefficients. The correlator includes two multipliers. The first of the multipliers is coupled to a source of an in-phase component of the input signal. The second of the multipliers is coupled to a source of a quadrature component of the input signal. The outputs of the multipliers are summed.

In the illustrative application, the input signal is a GPS signal. For this application, the inventive teachings are implemented in a signal processing system adapted to receive a GPS signal and provide in-phase and quadrature signals in response thereto. The signal is filtered with a finite impulse response filter to provided weighted signals. The weighted signals are processed to generate nulling and beamsteering weights for the weighted signals. The weights may be used to equalize the received signals.

In a more specific implementation, the received signals are partitioned into space frequency adaptive processing bands and space-time adaptive processing is performed within the SFAP bands.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1A:
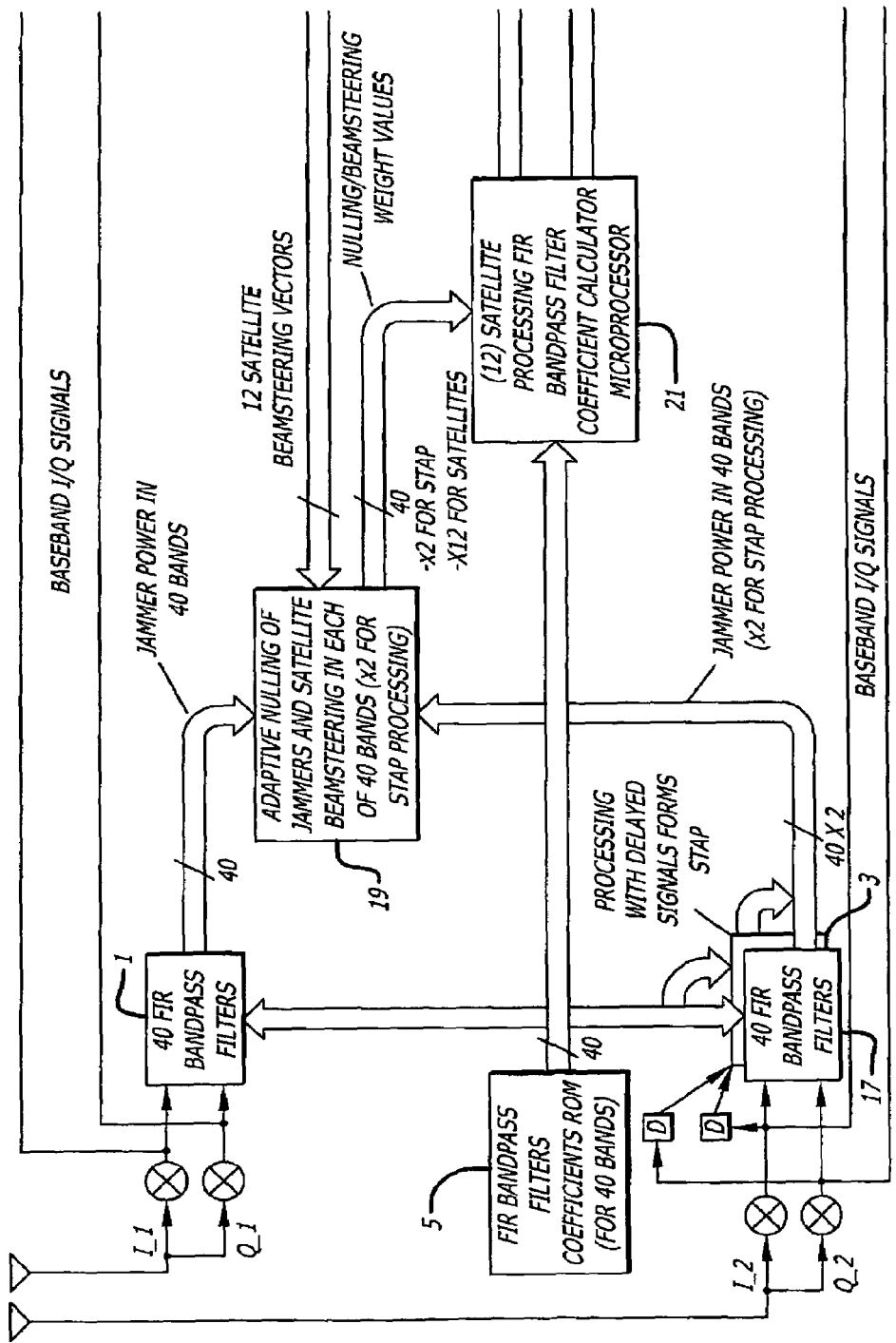
FIG. 1A-1B is a functional block diagram of an illustrative embodiment of Space Frequency with Space Time Adaptive Processing (SPAP-T) implemented with dynamic weight processing in accordance with the teachings of the present invention.
Figure 1B:
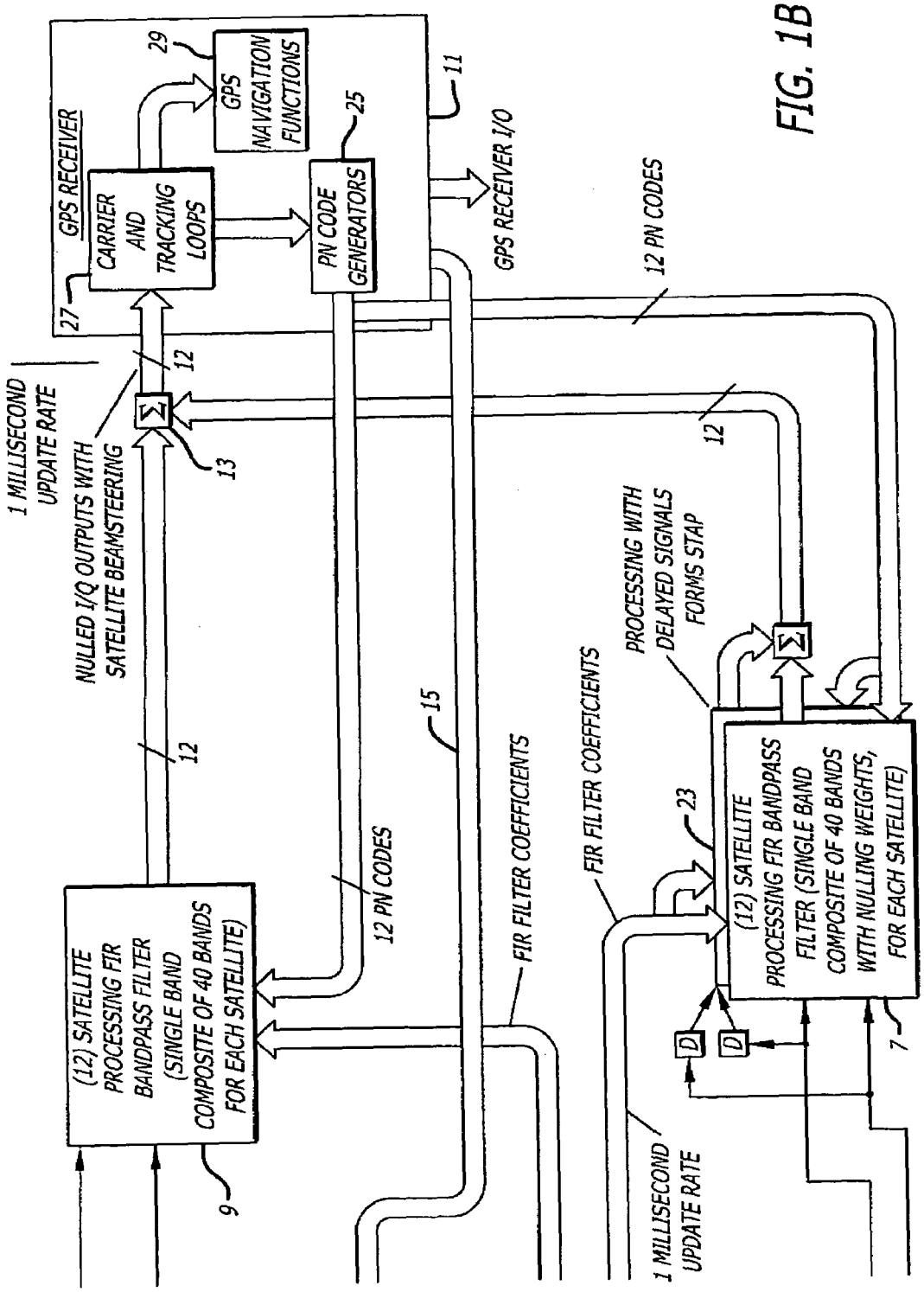

FIG. 1A-1B is a functional block diagram of an illustrative embodiment of Space Frequency with Space Time Adaptive Processing (SPAP-T) implemented with dynamic weight processing in accordance with the teachings of the present invention. While FIG. 1A-1B shows a two channel implementation, those skilled in the art will appreciate that the present teachings are not limited thereto. Multiple channels may be provided without departing from the, scope of the present teachings.

As shown in FIG. 1A-1B. the received GPS plus jamming signals from the antenna outputs are down converted to baseband in I (in-phase) and Q (quadrature) detectors in each of the 2 channels. The baseband I1 and Q1 signals are digitized using high speed 12 bit A/D converters (not shown) and applied to a bank of digital filters 1 of which 40 are shown in the illustrative embodiment, each implemented as a 255 KHz wide, 128 tap, Kaiser-Bessel windowed digital FIR (finite impulse response) filter. In the illustrative embodiment, the combined filter bandwidth of the 40 filters covers a bandwidth of 10.2 MHz. Channel 2 contains a similar set of 40 digital bandpass FIR filters 17. In addition, channel 2 contains another bank of 40 bandpass FIR filters 3 that are driven by time delayed versions of the I2 and Q2 signals. This delayed signal processing is used to form STAP processing (Space Time Adaptive Processing) in each of the bands.

Jammer energy that falls within a given band in channels 1 and 2 is applied to the adaptive nulling and satellite beamsteering function as shown at 19. Spatial adaptive jammer interference cancellation takes place in each band that contains jammer energy. This is referred to as SFAP processing (Space Frequency Adaptive Processing). In addition, satellite signal beamsteering takes place in each band. By performing STAP processing in each of the bands Space Frequency with Space Time Adaptive Processing (SFAP-T) is formed which should provide a significant capability to compensate for poorly matched antenna elements thereby greatly enhancing the performance of GPS in a highly jammed environment.

The coefficients for the 128 tap FIR filter for each of the 40 bands are contained in the coefficients ROM 5. Upon receiver power-up, these coefficients are loaded into the circuitry that implements the bandpass filters for channels 1 (1) and 2 (17). In addition, the coefficients are applied to the Satellite Processing FIR Bandpass Filter Coefficient Calculator microprocessor 21 as shown. The jammer nulling and satellite beamsteering weight values formed in 19 for each of the 40 bands are also applied to the Coefficient Calculator microprocessor 21 where they are combined with the FIR filter coefficients and used to form the Satellite Processing FIR Bandpass Filter 7 for channel 2. This FIR filter represents a 10.2 MHz wide composite filter that is the summation of all 40 bandpass filters, with nulling and beamsteering in each band. These combined coefficients are recalculated at the adaptive nulling and beamsteering algorithm iteration rate of, say, 1 millisecond (simultaneously for all 40 bands). Note that there are multiple copies of this composite filter for processing multiple GPS satellites (e.g., 12 satellites). This is suggested since there is a unique nulling and beamsteering weight set for each satellite (although the jammers are common for all satellites the beamsteering is unique since each satellite is in a different position in the sky). The FIR filter coefficients used by the channel 1 Satellite Processing FIR Bandpass Filter 9 do not contain the nulling and beamsteering weight values and can therefore be computed and loaded once upon receiver power-up. Also, note that the channel 2 Satellite Processing FIR Bandpass Filter 7 contains another composite bandpass filter 23 (one for each of the 12 satellites) which is driven by delayed I2 and Q2 samples for forming STAP processing. The satellite PN code (25), generated in the GPS receiver 11, is also applied to the Satellite Processing FIR Bandpass Filter functions 7, 9, and 23 and used to correlate the received GPS satellite signal for carrier and code tracking 12 in the receiver 11.

As shown in FIG. 1A-1B, the outputs of the Satellite Processing FIR Bandpass Filters 7, 9, and 23 are summed in 13. The output of the summer contains the reconstructed satellite carrier signal (when the locally generated PN code is aligned with the received satellite PN code) with spatial nulls (in the adapted antenna pattern) towards the jammers and beams towards the satellites.

As mentioned above, the GPS satellite carrier and PN code is tracked by the tracking loops shown in the receiver 27. In addition, the receiver contains the GPS navigation functions 29 which provide the satellite beam steering vector data 15 for the 12 satellites as shown. It should be noted that additional antenna element channels can be implemented, e.g., 5 channels, using a step and repeat of the circuitry.

Figure 1C:
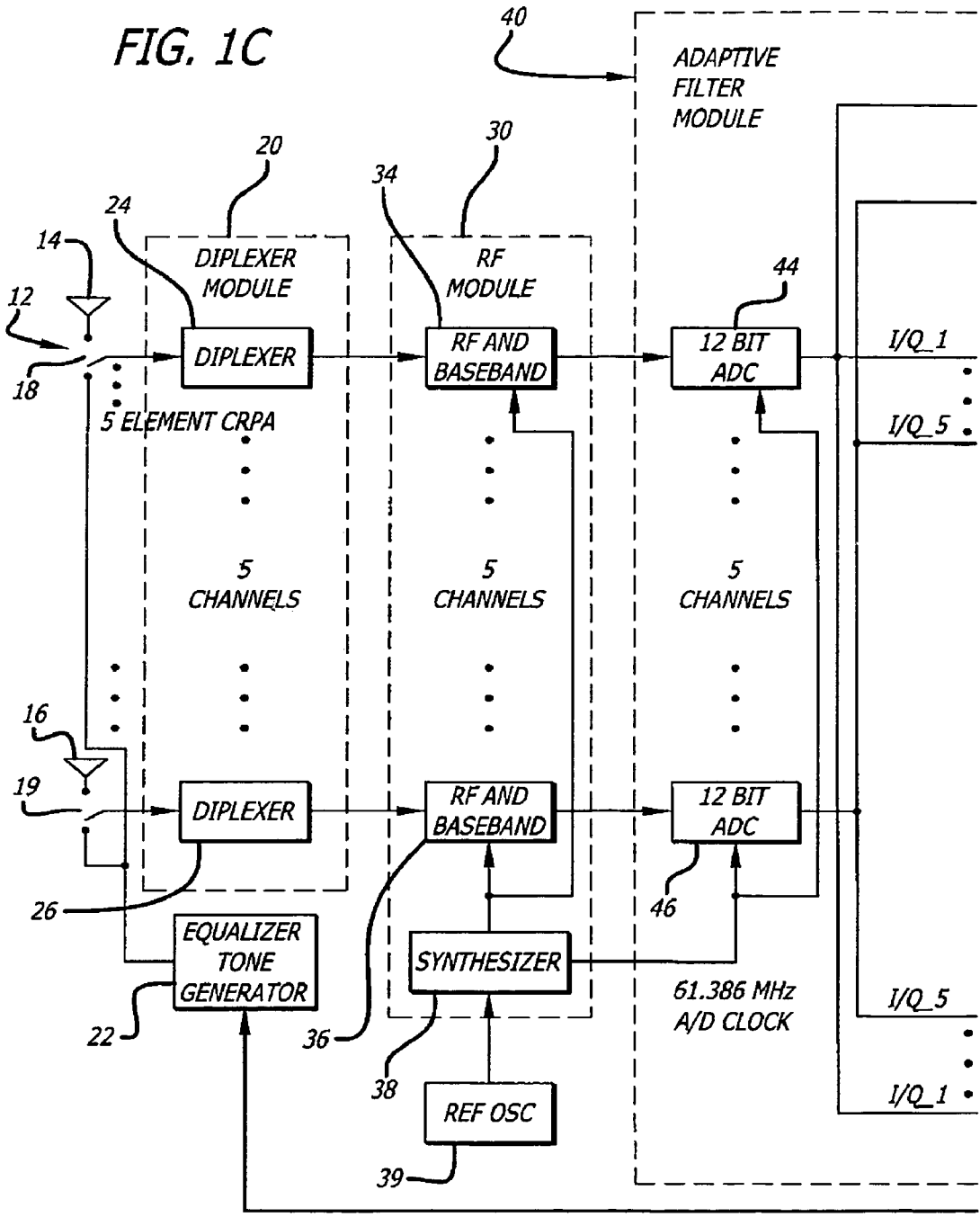
FIG. 1C-1D is a simplified block diagram of a space frequency/time adaptive dynamic weight processor implemented in accordance with an illustrative embodiment of the present teachings.
Figure 1D:
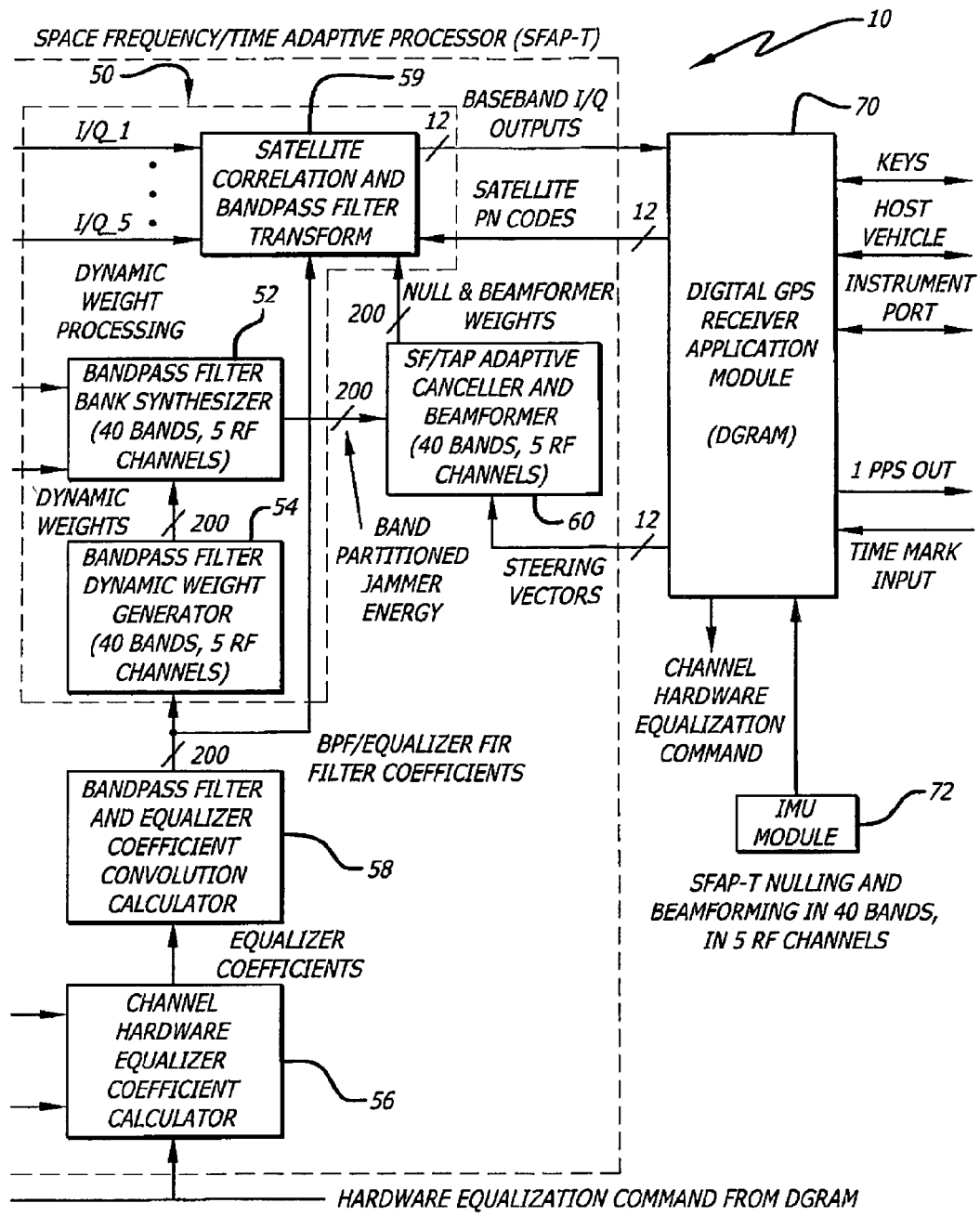

FIG. 1C-1D is a simplified block diagram of a space frequency/time adaptive dynamic weight processor implemented in accordance with an illustrative embodiment of the present teachings. The processor 10 includes an array 12 of antenna elements of which only two are shown 14 and 16. In the illustrative embodiment, the array 12 is a five element (i.e. five channel) CRPA (Controlled Reception Pattern Antenna). Those skilled in the art will appreciate that the present invention is not limited to the number of elements in the antenna array. Likewise, in the illustrative embodiment, the antenna elements are adapted to receive OPS signals. Nonetheless, the present invention is not limited to GPS applications, as will be appreciated by those of ordinary skill in the art.

Each element 14, 16, etc. in the array 12 is connected to an associated diplexer 24, 26, etc. respectively in a diplexer module 20 via an associated switch 18, 19, etc. respectively. The switches 18, 19, etc. serve to selectively couple the output from an equalizer tone generator 22 to the diplexers. Each diplexer 24, 26, etc. is connected to an associated radio frequency (RF) to baseband downconverter 34, 36, etc. respectively in an RF module 30. The down converters receive a reference frequency from a frequency synthesizer 38, which operates on a signal provided by a reference oscillator 39. Thus, GPS satellite signals plus jamming signals received by the antenna array 12 are downconverted and sampled by a set of analog-to-digital (A/D) converters 44-46 in an adaptive filter module 40 implemented in accordance with the present teachings. The adaptive filter module 40 includes a dynamic weight processor 50 having a bandpass filter bank synthesizer 52, a bandpass filter dynamic weight generator 54 and a satellite correlation and bandpass filter transform 59.

In addition, the adaptive filter module 40 includes a channel hardware equalizer coefficient calculator 56, a bandpass filter and equalizer coefficient convolution calculator 58 and a Space Frequency/Time Adaptive Processor (SF/TAP) adaptive canceller and beamformer 60.

Each channel's digitized output is applied to the bandpass filter bank synthesizer 52 of a dynamic weight processor 50, the channel hardware equalizer coefficient calculator 56 and the Satellite Correlation and Bandpass Filter Transform 59. Within the dynamic weight processor 50, Space Time Adaptive Processing (STAP) is implemented in each of a number (e.g. 40 bands) by the filter bank synthesizer 52 which generates multiple (in this example 40) sets of narrow bandpass filters for each of the RF channels. STAP is well-known in the art. See for example the proceedings from the 2004 IEEE Radar Conference entitled Innovative Radar Technologies—Expanding System Capabilities, Apr. 26-29, 2004, specifically, Session 8 Space-Time Adaptive Processing and Tutorial 1.2 Space-Time Adaptive Processing for AMTI and GMTI Radar, the teachings of which are hereby incorporated herein by reference.

The inputs to the multiple sets of narrow band filters are time-delayed versions of the I and Q channel signals which form the STAP processing within each narrow band filter. The multiple (i.e. five) channels of GPS signals (typically 10 MHz in bandwidth) along with the jammer signals are passed through the multiple (i.e. 40) bands of bandpass filter bank synthesizer 52 which outputs plural (in the illustrative embodiment 200) channels of band partitioned jammer energy.

As discussed more fully below, the plural bandpass filter banks are created by applying dynamic weights generated by the bandpass filter dynamic weight generator 54. The dynamic weight generator 54 includes plural finite impulse response (FIR) filters for which coefficients are provided by the bandpass filter and equalizer coefficient convolution calculator 58. As discussed more fully below, the present invention provides a novel, simplified method and system for implementing a FIR filter.

Equalization for each of the RF channels is provided via coefficients generated by the channel hardware equalizer coefficient calculator 56 in response to the received and digitized inphase and quadrature (I and Q) signals and input to the equalizer coefficient convolution calculator 58.

The channel hardware equalizer coefficient calculator 56 produces a set of FIR filter equalizer coefficients that are used to compensate for the receiver channel hardware gain and phase mismatches. Using a series of tones applied to the receiver channel inputs, with the antenna elements switched out, the equalizer adaptively adjusts a FIR filter which causes each auxiliary channel impulse response to match that of the reference channel. The antenna elements are not part of this equalization process. Instead, the CRPA elements are equalized, when jamming is present, by the STAP processing in each band that is part of the adaptive cancellation process. This is of particular benefit for GPS M code operation since the antenna element mismatches are more difficult to control over the wider bandwidth of the M code signal.

As shown in FIG. 1A-1B, the equalizer coefficients are combined with the FIR filter coefficients in the bandpass filter and coefficient convolution calculator 58 to form a new set of filter coefficients that are used to generate the dynamic weights.

In the illustrative implementation, each filter in the filter bank 52 is a 255 KHz wide, 128 tap FIR filter that provides an output to the adaptive canceller and beamformer 60. The filters function as a bandpass filter and an equalizer for each of the subbands. An output is provided for each of the multiple sets of 40 bands in all five RF channels. Thus, nulling and beamforming may be provided for say 12 satellites with independent beams for each of the satellites.

The SF/TAP adaptive canceller and beamformer 60 receives the channels of band partitioned jammer energy and generates weights to form beams to GPS sources (e.g. satellites) and nulls to jammers in response to steering vectors provided by a digital GPS receiver application module (DGRAM) 70. The DGRAM 70 receives keys, host vehicle data, instrument port data, 1 PPS Out and time mark input data from the host vehicle (not shown) and inertial reference data from an inertial measurement unit 72 and outputs channel hardware equalization command to the equalization tone generator 22 and the channel hardware equalizer coefficient calculator 56.

The jammer nulling and satellite beamsteering dynamic weights provided by the SF/TAP adaptive canceller and beamformer 60 and FIR filter coefficients from the bandpass filter and equalizer coefficient convolution calculator 58, are input to the satellite correlation and bandpass filter transform 59. The satellite correlation and bandpass filter transform function 59 linearly transforms the new set of filter coefficients into coefficients that represent a composite filter that is the summation of all 40 bandpass filters, for each RF channel, with nulling and beamforming in each band. In addition, the composite filter coefficients, operating in conjunction with the locally generated PN code, perform the function of satellite signal correlation. The satellite correlation and bandpass filter transform 59 outputs baseband inphase and quadrature (I and Q) signals to the digital GPS receiver 70 adapted for use with satellite pseudo-noise (PN) codes provided by the GPS receiver 70.

Dynamic Weight Processing: The system and method for dynamic weight processing of the present invention provides a novel way of implementing digital FIR filters. The inventive technique is particularly beneficial for implementing FIR filters containing a large number of tap coefficients in systems that operate with a binary PN signal waveform.

Figure 2A:
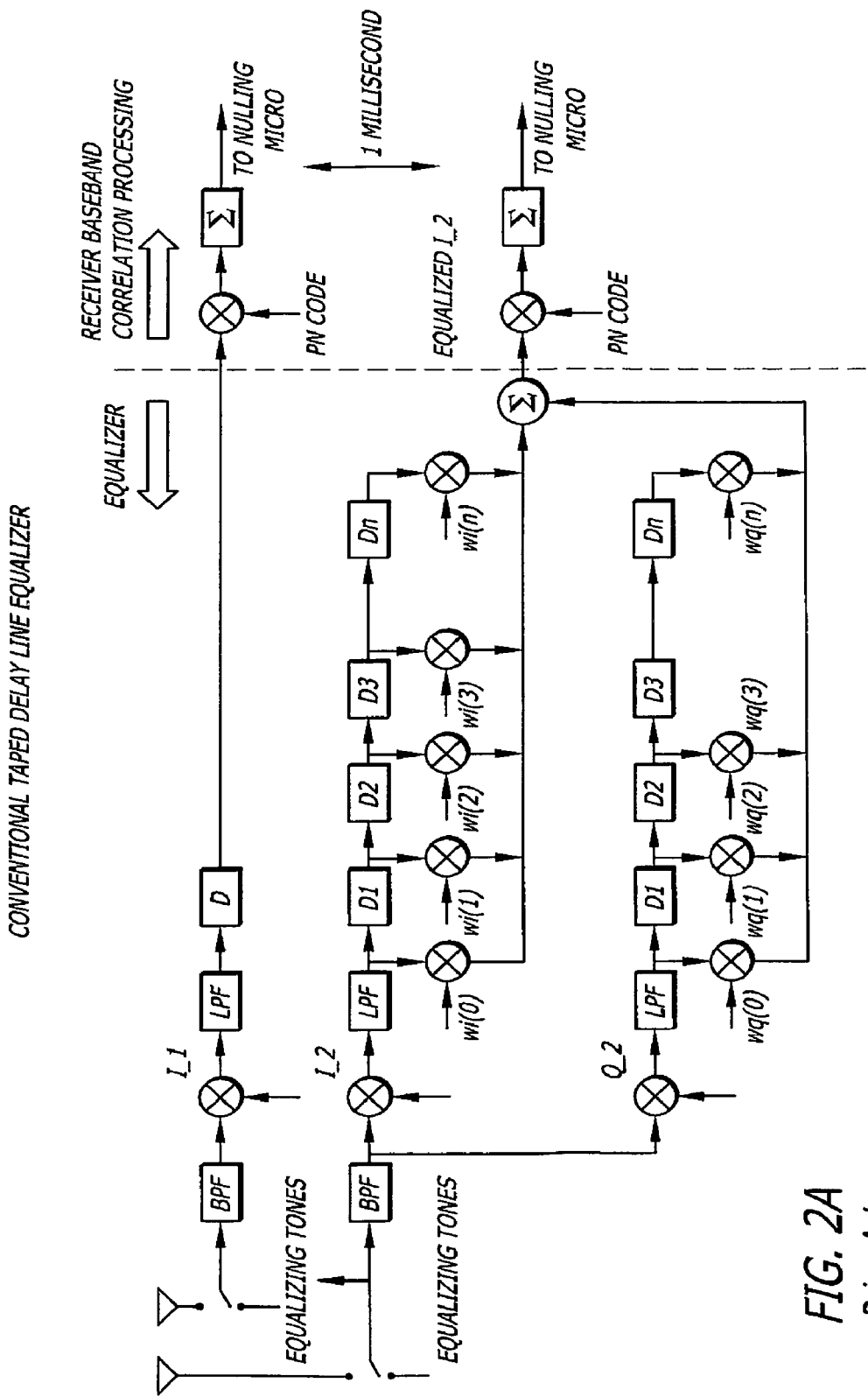
FIG. 2A is a simplified diagrammatic representation of an equalizer with tapped delay lines and multipliers used to adaptively form a FIR filter impulse response in accordance with conventional teachings.

FIG. 2A is a simplified diagrammatic representation of an equalizer with tapped delay lines and multipliers used to adaptively form a FIR filter impulse response in accordance with conventional teachings.

Figure 2B:
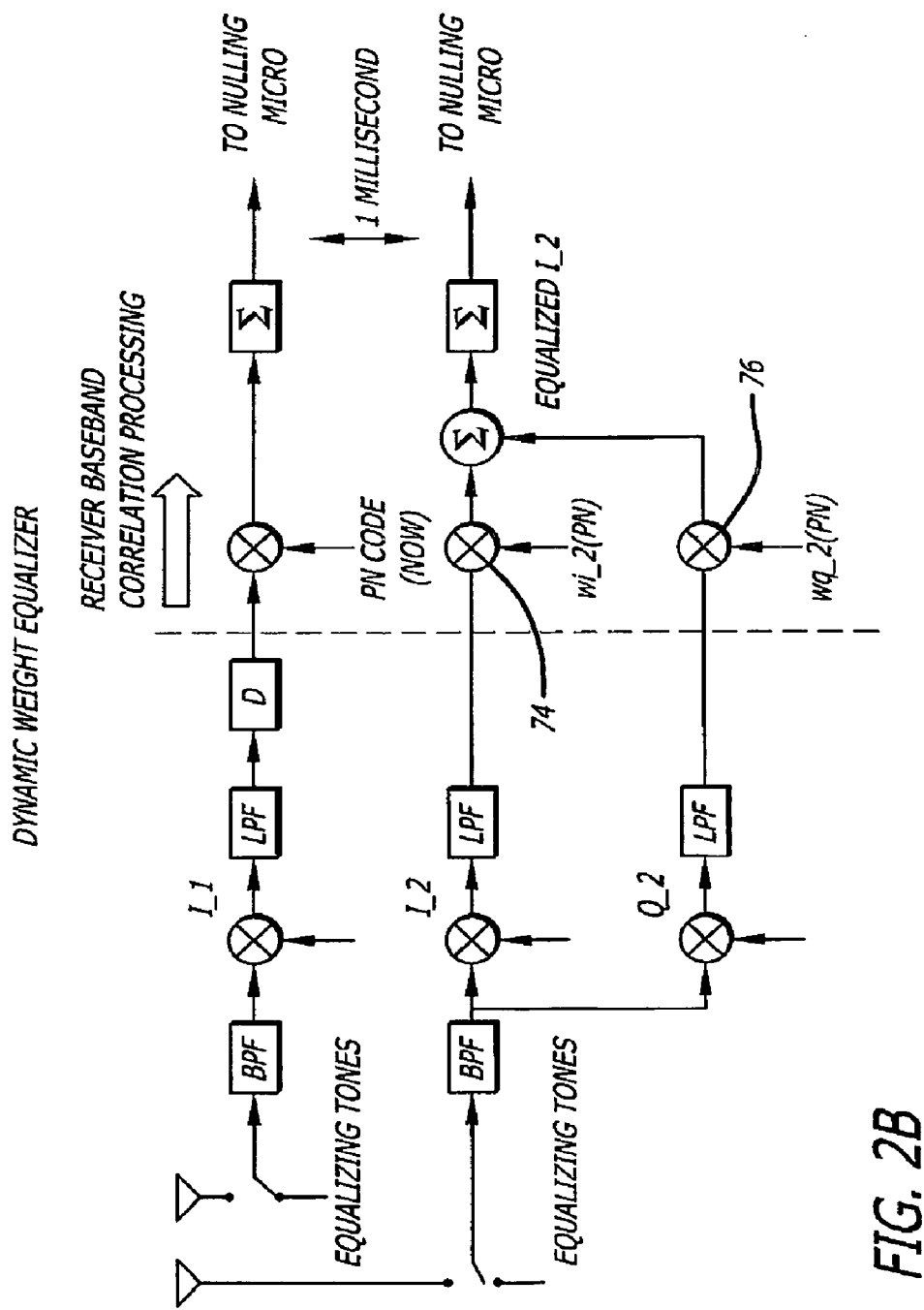
FIG. 2B is a block diagram of an illustrative implementation of an equalizer in accordance with the present teachings.

FIG. 2B is a block diagram of an illustrative implementation of an equalizer in accordance with the present teachings. Note that in FIG. 2A, numerous multipliers and delay elements are required to implement an equalizer. To implement a 128 tap bandpass filter, 128 multipliers would be required for the inphase signal and 128 multipliers would be required for the quadrature signal for each channel. Inasmuch as say 40 channels might be required, 40 times 2 times 128 multipliers and delay elements would be required. Inasmuch as the speeds currently required necessitate a hardware implementation, it can easily be appreciated why this would not be feasible using conventional teachings.

However, as shown in FIG. 2B, and as discussed more fully below, in accordance with the present teachings, an equalizer is implemented with fewer multipliers and delay elements by providing equalizer weights, $wi\_2(PN)$ and $wq\_2(PN)$, to first and second multipliers 74 and 76. The equalizer weights, operating in conjunction with multipliers 74 and 76, also provide the function of satellite signal PN correlation as described more fully below. Although a FIR filter is shown to implement an equalizer, those skilled in the art will appreciate that the present teachings are not limited thereto. The present teachings may be used to implement high pass, low pass, band pass and notch filters and other common FIR filter components and functions without departing from the scope of the present teachings.

Figure 2C:
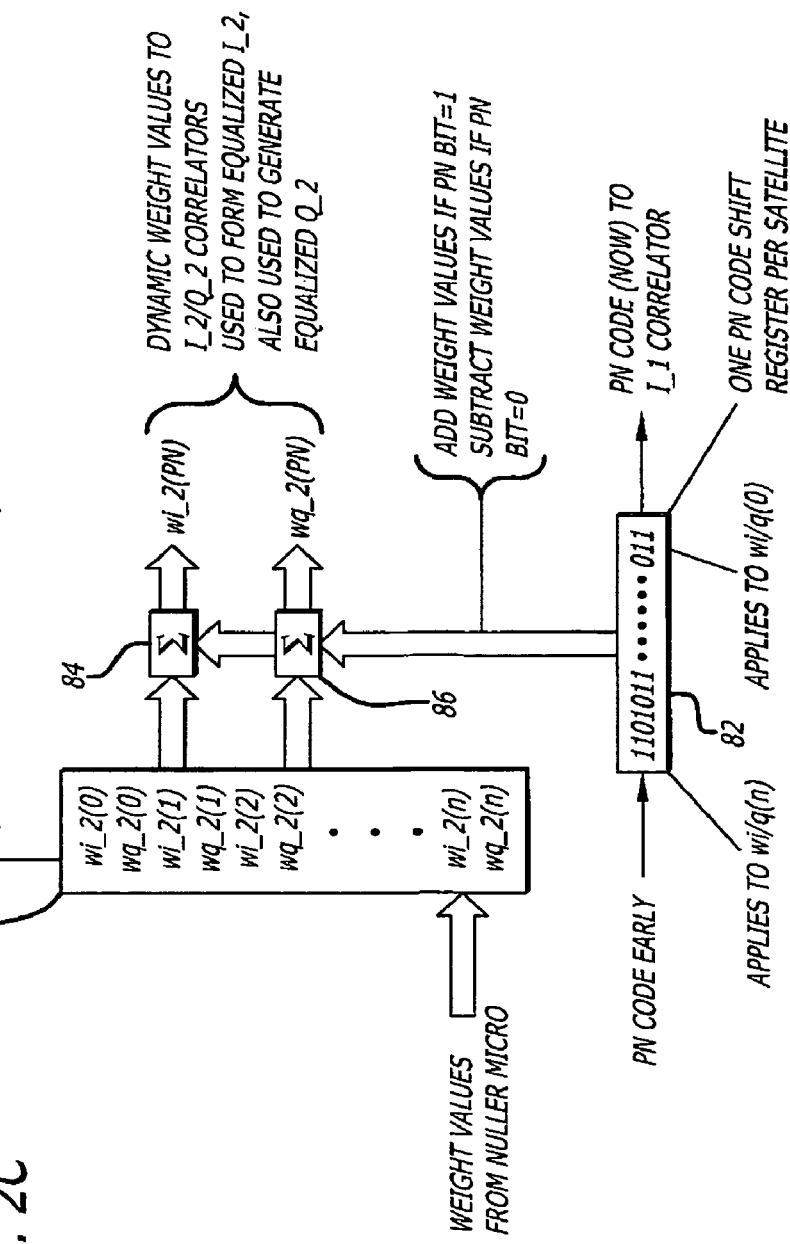
FIG. 2C is a block diagram showing a lookup table and register arrangement for implementing correlation processing at baseband in accordance with the teachings of the present invention.
Figure 3A:
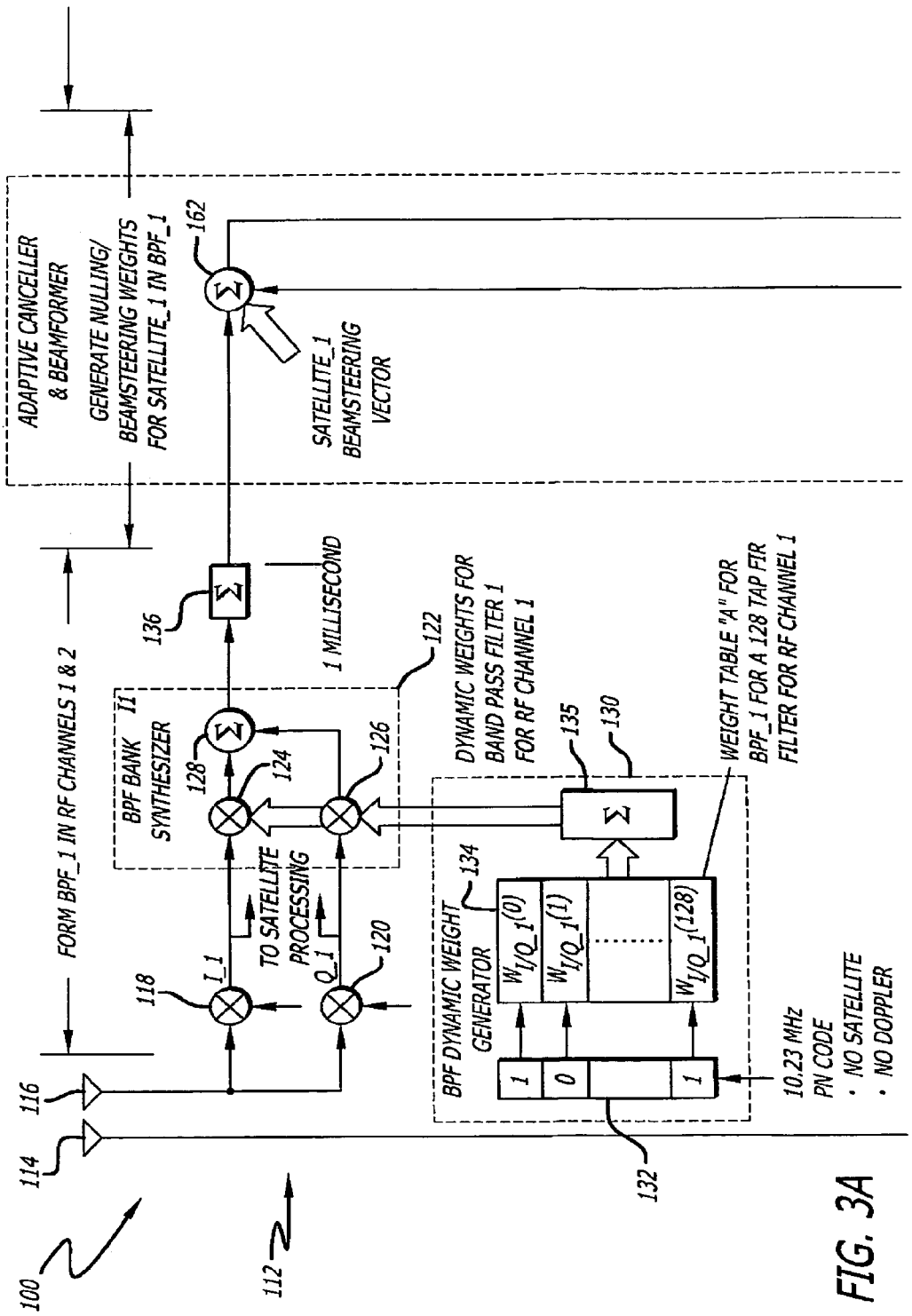
FIG. 3A-3D is a block diagram with shows an illustrative implementation of a simplified 2 channel SFAP system using dynamic weight processing in accordance with the teachings of the present invention.
Figure 3B:
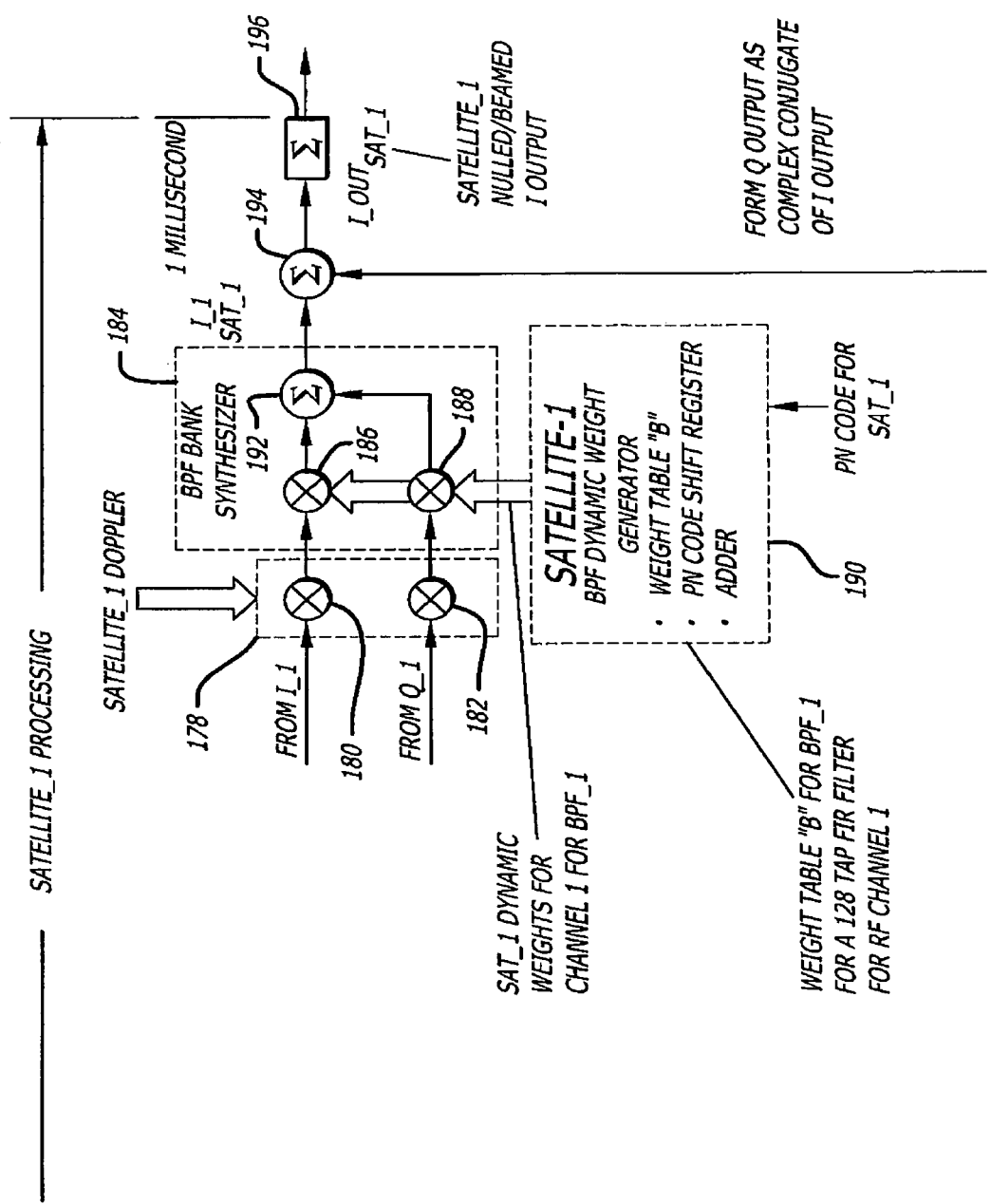
Figure 3C:
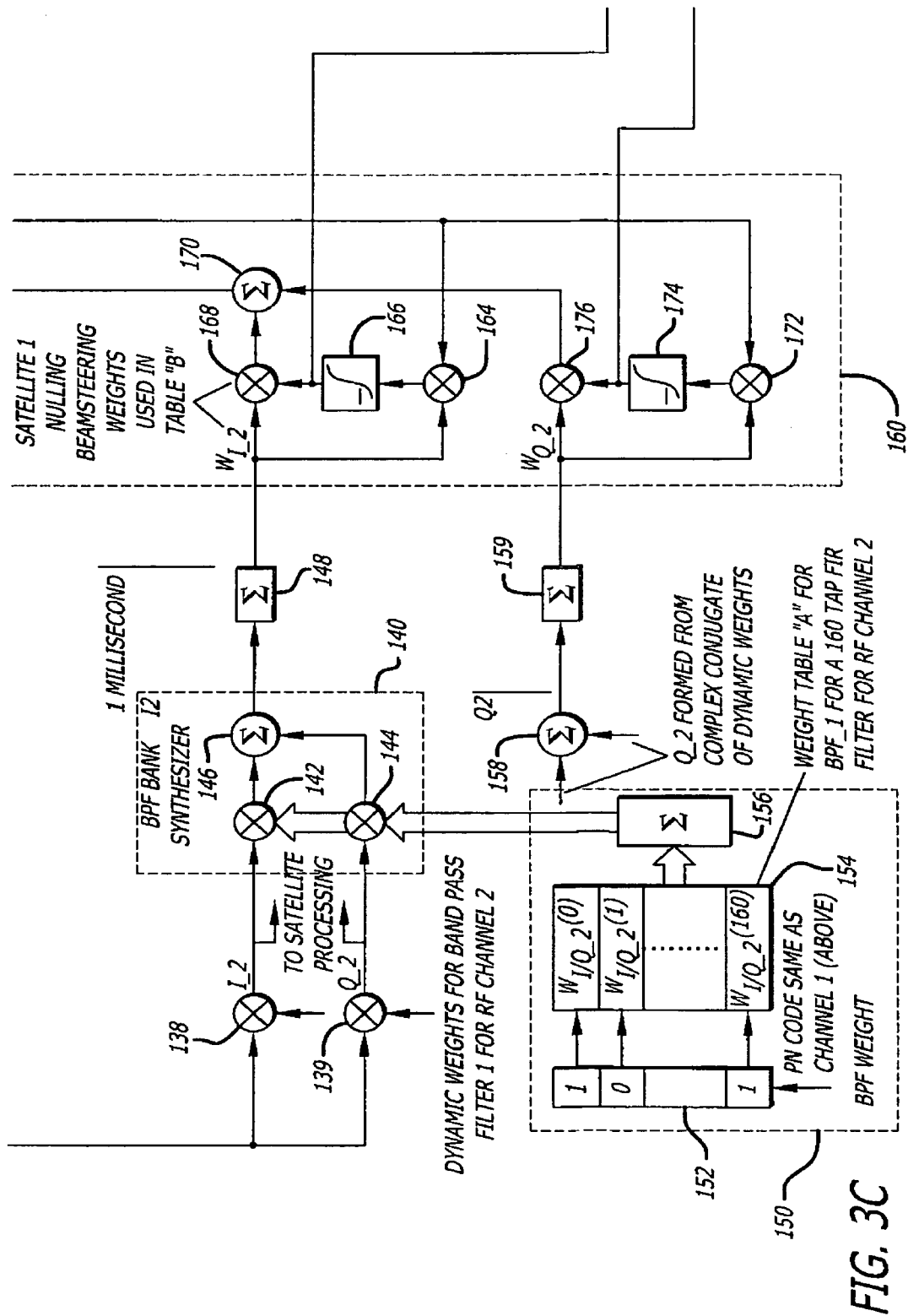
Figure 3D:
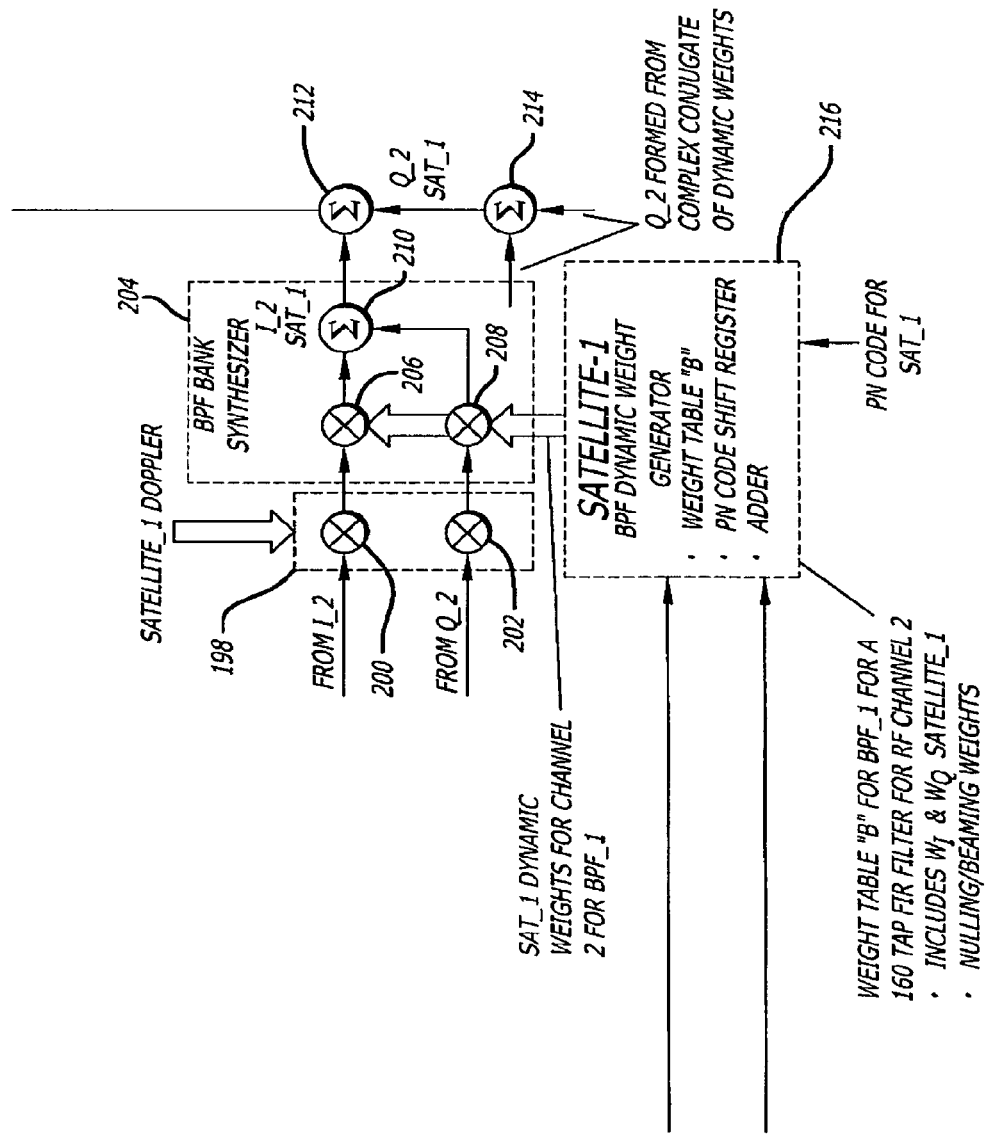

FIG. 2C is a block diagram showing a lookup table and shift register arrangement for implementing correlation processing at baseband in accordance with the teachings of the present invention. As illustrated in FIG. 2C, and in accordance with the present teachings, weights for the multipliers are provided by a lookup table 80 through summers 84 and 86 operating under control of a shift register 82. The length of the shift register 82 should match the length of the coefficient lookup table 80.

On each clock cycle, in first and second summers 84 and 86, logic is included so that the weight values from the top and bottom halves of a table found at a given address are added if the PN code is a '1' and subtracted if the PN code is a '0'. The summers 84 and 86 thereby output dynamic weight values to I and Q correlators 74 and 76 of FIG. 2B The elements of FIG. 2C are used to form the dynamic weights for one of the bands in the Bandpass Filter Dynamic Weight Generator 54 in FIG. 1A. Multipliers 74 and 76 in FIG. 2B are used to form one of the bandpass filters in the Bandpass Filter Bank Synthesizer 52 in FIG. 1A.

As shown for both the conventional and inventive implementations, the channel 2 (auxiliary channel) $I\_2$ and $Q\_2$ outputs are equalized against the channel 1 $I\_1$ output, delayed by several A/D sample clocks. Note that only equalized I2 is shown since the equalized Q_2 is derived from the complex conjugate of the I_2 equalizing weights. For the conventional equalizer both the I_1 and equalized I_2 outputs are applied to a PN correlation process (i.e., GPS receiver) which, in this example, integrates to 1 millisecond. The value of the PN code applied to the multiplier in this case is ±1. The same is true for the I_1 output of the Dynamic Weight Equalizer; however, the equalized I_2 path is significantly different. Note that there are no delay line elements or weighting coefficients in the I_2 path. Instead, the weighting coefficient multipliers are replaced by a table of equalizer weight coefficient values, an adder and a PN code shift register. The PN shift register is clocked synchronously with the A/D converter sampling clock. Also, there is a correlator multiplier function in both the I_2 and Q_2 paths. However, the ±1 PN code is replaced by a "Dynamic Weight" that has a value that is determined by the state of the PN code word that resides in the PN shift register and the equalizer weight values in the table shown in FIG. 2C and described above. The size of the weight table is determined by the length of the equalizer. For example, to implement a 32 tap equalizer there are 32 wi_2 entries and 32 wq_2 entries in the table. Also, the PN shift register is 32 bits long. To form the "Dynamic Weight", wi_2 (PN), for the I_2 correlation multiplier 74 the wi_2 weight values in the table are added together if the corresponding PN bit in the shift register is a 1 while the wi_2 values that correspond to a 0 PN bit are subtracted. An identical process is used to form wq_2. The result is a weight value that changes dynamically as the PN code is clocked through the shift register. Note that there is one weight table for each channel. If the weight values represent an equalizing FIR filter it is to be expected that the weight values in the tables would be different for the different channels. Since the PN codes for the satellites are different there are 12 PN shift registers (for 12 satellite tracking), along with their corresponding adders and I/Q "correlator functions". A simulation has been performed which shows that identical results are obtained for both the conventional and dynamic weight processing implementation of the equalizer.

The inventive implementation of a FIR filter offers the potential for a significant reduction in the number of gates that would be required to implement a custom ASIC chip, especially when the filter is large (i.e., 160 taps or more).

Equalization of Auxiliary Channels: The use of an equalizer should enable the dynamic weight processor to be fabricated with small chip inductors and capacitors that should not require factory tuning or adjustments. Low cost 5% or 10% tolerance components might be used since the equalizer should adaptively match the auxiliary channel impulse response to that of the reference channel.

Referring again to FIG. 2A, the channel 2 (auxiliary channel) I_2 and Q_2 outputs are equalized against the reference channel I_1 output, delayed by several A/D sample clocks. As shown in the figure, equalizing tones are applied to the receiver with the antenna elements switched out. The low pass filter shown represents all of the receiver channel amplifier and filter hardware, including the diplexer. As part of the receiver power-up initialization process a "calibration" of each auxiliary channels filter gain and phase, relative to the reference channel, is performed by applying equalizing tones with the antenna elements switched out. The amplitude of the tones should be equivalent to a jammer level of approximately 100 dB J/S. During track, occasional calibration updates may be performed to accommodate channel gain/phase variations that occur due to changes in temperature. In the illustrative embodiment, the tones are applied one at a time for approximately 10 milliseconds, across the GPS L1 and L2 bands. The tones are generated by a low cost synthesizer chip that is part of the RF assembly. To measure the phase and amplitude of the tones in each auxiliary I and Q channel, relative to the reference channel, a phase shift network will be implemented that forms the linear, weighted sum of delayed A/D samples to form a pseudo Q output. The delayed pseudo Q and undelayed output of the I or Q auxiliary channel will then be applied to the nulling algorithm which will be allowed to null the tone. The adapted weight vector contains the channel gain and phase data. As stated above, the tones are applied one at a time, with each auxiliary channel forming a single nulling loop relative to the reference channel.

The tap weights required to equalize each channel are determined by treating the calibration tones as jammers that are nulled by a tapped delay line transversal filter. The nulling solution is found by solving the matrix equation R×W=P for the optimal weight vector W where R is the input signal correlation matrix and P is the cross correlation vector between the desired response I_1 (delayed by several A/D sample clocks), and the input signal components (outputs of the I/Q delay elements of the auxiliary channel). A unique method of establishing the elements that form R and P has been developed to accommodate the architecture of the Dynamic Weight Equalizer. Since the elements are the expected value of the sum of the products for each tone their values are computed from the amplitude and phase measurements, mentioned above, of each auxiliary channel I and Q outputs relative to 1_I or Q_1 and the known time delay for each tap output which is established by the A/D sample rate. Cross frequency terms are ignored since the expected values between tones of different frequencies equals zero. The phase and amplitude measurements are made for each tone (one at a time) by running a post correlation nulling algorithm for each auxiliary channel relative to the reference channel. The nulling weights contain the desired phase/amplitude information. Once R and P have been established, W is solved for in software, in a microprocessor, by using a standard algorithm to solve a set of linear simultaneous equations. Note that the reference Q1 baseband channel is equalized to match the reference I1 baseband channel which enables the use of a nulling algorithm with complex adaptive weights.

Convolution of FIR Filters for use with Dynamic Weight Processing: The full benefit of dynamic weight processing is realized when FIR filters are cascaded. To implement SFAP-T in the Navigator the equalizer for each auxiliary channel is placed in series with each of the 40 bandpass; FIR filters. This is accomplished in the time domain by convolving the equalizer filter impulse response with each bandpass filters impulse response. The result is a new filter with a new set of coefficients for each combination of equalizer and bandpass filter. The convolution is performed in a software routine in a microprocessor 58 in FIG. 1A. For example, convolving the 32 tap equalizer with the 128 tap Kaiser Bessel bandpass FIR filter results in a new 160 tap FIR filter that has a frequency response that is the product of the individual frequency response of each of the two filters. To implement the new filter with dynamic weight processing the new tap coefficients are placed in the weight table that, in this case, accommodates 160 values. As periodic calibration updates occur for the equalizers the weight tables are updated with the new coefficients that are generated in the convolution software routine.

Dynamic Weight Processing SFAP with Time Adaptive Processing (SFAP-T: This section describes how the Space Frequency/Time Adaptive Processing is implemented using dynamic weight processing in accordance with the present teachings. The SFAP-T is achieved using STAP in each of the SFAP (Space Frequency Adaptive Processing) bands. Implementing the SFAP function in 40 bands, using Dynamic Weight Processing, will be described first before describing how the STAP function is implemented to form the SFAP-T function. The use of 40 bands in the illustrative embodiment, with each band being 255 KHz wide, was selected to enable a processing of the GPS P(Y) code in a ±5.1 MHz band and the M code in a ±2.5 MHz band around each sideband. This bandwidth should result in less than a 1 dB implementation loss for the GPS satellite signal while attenuating jammers outside this band by greater than 75 dB. This also simplifies the receiver channel filter design with regard to the A/D sampling rate and aliasing.

FIG. 3A-3D is a block diagram with shows an illustrative implementation of a simplified 2 channel SFAP system using dynamic weight processing in accordance with the teachings of the present invention. Nulling and beamforming is implemented in one band, for satellite 1. The diagram is partitioned into 3 sections as shown. The left section shows how the bandpass filter is formed with dynamic weight processing in channel 1 (the reference channel) and channel 2 (the auxiliary channel). The middle section shows nulling and beamforming for satellite 1. An LMS algorithm is shown for descriptive purposes. The right side of FIG. 3 shows the satellite 1 Dynamic Weight Processing. Referring to the upper left portion of the figure, weight table "A" 134 contains the weight values that form a 255 KHz wide, 128 tap Kaiser Bessel FIR filter translated to bandpass 1. The adder 135, along with the PN shift register 132, is used to form the dynamic weight which is applied to the I_1 and Q_1 correlating multipliers 124 and 126 respectively as shown. The summed output of these multipliers (see summer 128) forms the 255 KHz wide band pass filter in band 1, for channel 1, with the response of a 128 tap Kaiser Bessel windowed FIR filter.

In the illustrative embodiment, the common 10.23 MHz PN code (non-GPS-satellite) is used to form all 40 of the bandpass filters, in all 5 RF channels. The PN code spreads the jammer waveform, which enables the use of post correlation processing in each band to null jammers and form satellite beams. Note that, as a result of operation of the dynamic weight processing-scheme of the present invention, the PN spreading occurs at the output of each bandpass filter. Thus, a CW jammer that is in a particular band pass filter will be spread at the output of that filter and nulled by the weight calculator nulling algorithm for that band.

The components 140, 148, 150, 158 and 159 in the lower left portion of FIG. 3 are used to form the same bandpass filter for channel 2, band 1. The tail of the arrows are from multipliers that are like 142 and 144 (also driven by I_2 and Q_2), except that the dynamic weights that drive these multipliers are "swapped" (with a sign reversal for one of the dynamic weights to form the complex conjugate) with the dynamic weights that drive 142 and 144. The weight table for this filter however, includes a 32 tap FIR filter equalizer for channel 2. Note that all the weight tables that are used to form the bandpass filters are referred to as the "A" tables while "B" tables are used for the satellite dynamic weight processing as shown on the right side of FIG. 3. The "B" tables are constructed from the "A" tables as described below.

To implement post correlation nulling and beamforming the channel 1 and channel 2 bandpass filter outputs are integrated as shown and applied to a nulling and beamforming processor 160. The processor 160 will use the nulling/beamforming weights for channel 2, in band 1 to form a spatial null in the direction of the jammer and direct a beam towards satellite 1 in the 255 KHz band in the illustrative embodiment (more than 2 CRPA elements are required to provide sufficient degrees of freedom to form a null and a beam).

The implementation of dynamic weight processing for satellite 1, in band 1, is shown on the right side of FIG. 3. The dynamic weight processing functions are similar to the functions used for band partitioning except that the "B" weight tables incorporate the satellite 1 nulling and beamforming weights described above and the satellite 1 PN code is used to form the dynamic weights. Also, a phase rotator (digital numerically controlled oscillator) is used, ahead of the correlation multipliers, for satellite 1 carrier tracking. Since the dynamic weights formed from the "B" weight table incorporate the nulling and beamforming weights the I_out_sat_1 output output of the summer 196 shown in the upper right corner of FIG. 3 contains nulls towards jammers and a beam towards satellite 1. Also, since the satellite 1 PN code was used in generating the dynamic weights, the reconstructed satellite 1 carrier is present in the I_out_sat_1 output when PN correlation is achieved.

To implement the SFAP in 40 bands requires the use of 40 "A" type weight tables for each RF channel, each containing 160 coefficients that represent a 128 tap FIR band pass filter convolved with a 32 tap equalizer. Thus, 5×40=200 weight tables are required to implement a receiver that operates with a 5 element CRPA.

A key factor in the implementation of SFAP-T in 40 frequency bands, using the dynamic weight technology, is that the 160 weight values in the "B" tables, for each satellite, represent the linear sum of the 40 bandpass filters from the "A" tables, including the nulling and beamsteering information in each of the bands. Thus, only 5×12=60 weight tables are required to provide 12 satellite tracking.

Figure 4:
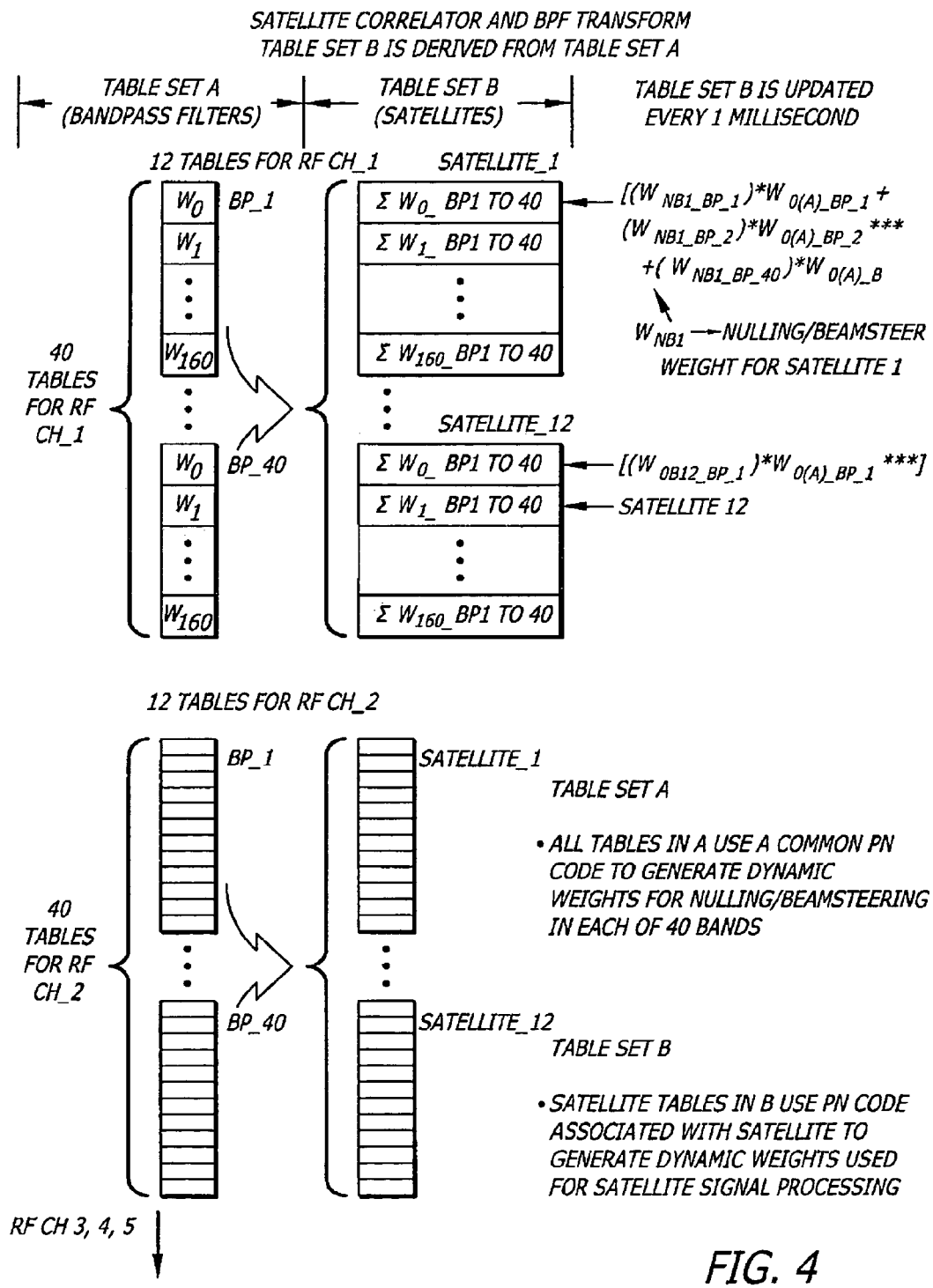
FIG. 4 is a diagram showing a derivation of the "B" tables from the weight values in the "A" tables modified by the nulling and beamforming weights in accordance with the inventive teachings.

FIG. 4 is a diagram showing a derivation of the "B" tables from the weight values in the "A" tables modified by the nulling and beamforming weights in accordance with the inventive teachings. Since the "A" tables use a common PN code to generate the dynamic weights the corresponding FIR filter weight values in the "A" tables either add or subtract from the composite weight values in the "B" tables as shown in FIG. 4. Thus the first entry in the satellite_1, RF channel 1 "B" weight table is the sum of the 40 $W_o$ terms in the 40 weight tables for RF channel 1, with each $W_o$ term multiplied by the appropriate satellite_1 nulling/beamforming weight.

Figure 5A:
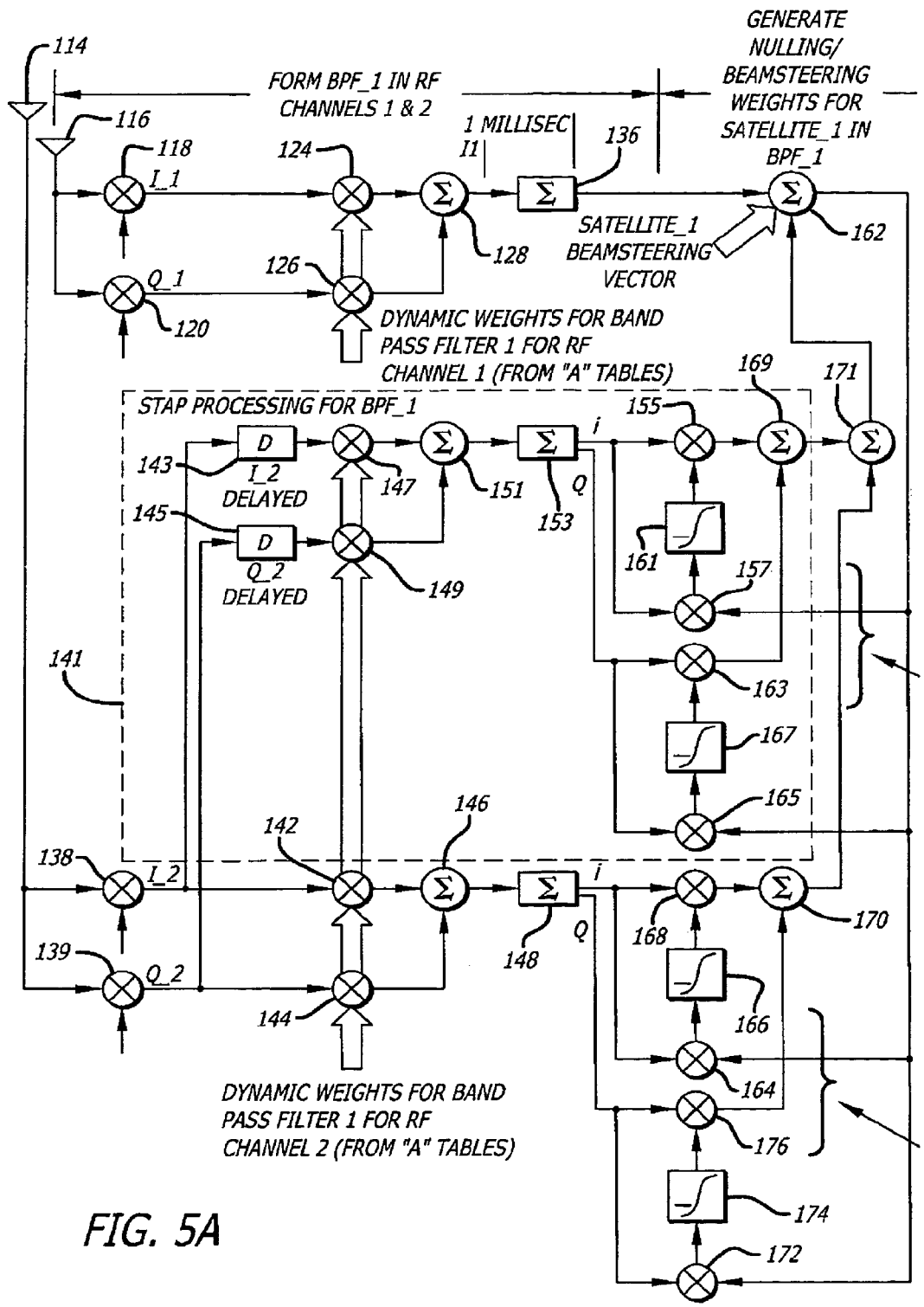
FIG. 5A-5B is a block diagram which illustrates how the SFAP-T capability is formed by adding a STAP function to each bandpass filter in accordance with an illustrative embodiment of the present teachings.
Figure 5B:
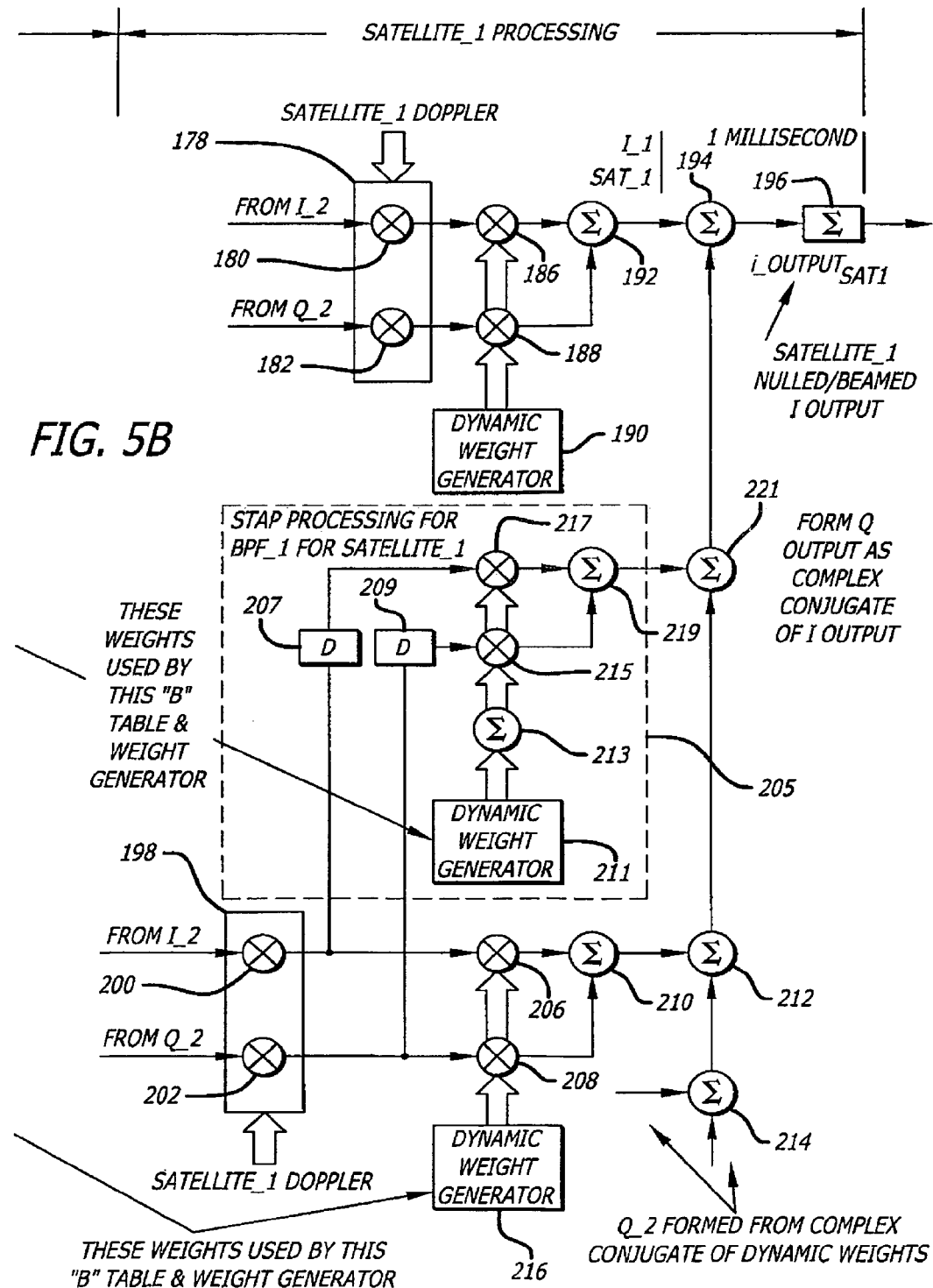

FIG. 5A-5B is a block diagram which illustrates how the SFAP-T capability is formed by adding a STAP function to each bandpass filter in accordance with an illustrative embodiment of the present teachings. The left side of FIG. 5 shows the addition of a second processing tap to band pass 1, in RE channel 2. As can be seen a time delayed version of the input signal is derived from I2 and Q2 and applied to multiplying correlators 147 and 149 that use the same dynamic weight that is used in the non-delayed path in band 1, channel 2. The delay path correlator outputs are combined and applied to nulling and beamforming weights. To form a 2 tap SFAP-T function, that provides milling and beamforming in the 255 KHz band, the output of the nulling weight set in the delayed path is added to the nulling algorithm as shown.

To add the 2 tap SFAP-T function to the satellite dynamic weight processing, a second "B" weight table 211 and correlators 215 and 217, driven by delayed I2 and Q2 signals, are implemented as shown on the right side of FIG. 5. Note that the second "B" weight table 211 incorporates the nulling and beamforming weights from the delayed path. The STAP can be extended to more than two taps.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A dynamic weight generator comprising:
   a first memory for storing a PN code;
   a second memory for storing a plurality of weights, said second memory being coupled to said first memory whereby data output by said first memory is used to address data stored in said second memory; and
   a correlator for multiplying an input signal by data output by said second memory.

2. The invention of claim 1 wherein said weights are finite impulse response filter correlation coefficients.

3. The invention of claim 1 wherein said correlator includes two multipliers.

4. The invention of claim 3 wherein a first of said multipliers is coupled to a source of an in-phase component of said input signal.

5. The invention of claim 4 wherein a second of said multipliers is coupled to a source of a quadrature component of said input signal.

6. The invention of claim 5 further including means for summing the outputs of said multipliers.

7. The invention of claim 1 wherein said input signal is a GPS signal.

8. A signal processing system comprising:
   first means for receiving a signal and providing in-phase and quadrature signals in response thereto;
   second means filtering said in-phase and quadrature signals with dynamic weights to provided weighted signals, said second means including a finite impulse response filter, said filter being implemented with a dynamic weight processor, said dynamic weight processor including:
   a first memory for storing a PN code;
   a second memory for storing a plurality of weights, said second memory being coupled to said first memory whereby data output by said first memory is used to address data stored in said second memory; and
   a correlator for multiplying an input signal by data output said second memory; and
   third means for generating nulling and beamsteering weights for said weighted signals.

9. The invention of claim 8 further including means for equalizing said signals.

10. The invention of claim 8 further including means for partitioning said in-phase and quadrature signals in plural bands.

11. The invention of claim 10 further including means for processing at least one of said bands in accordance with a space frequency adaptive processing scheme.

12. The invention of claim 11 further including means for performing space time adaptive processing-within at least one of said bands.

13. The invention of claim 8 wherein said signal is a GPS signal.

14. A method for dynamic weight generation including the steps of:
   storing a PN code in a first memory;
   storing a plurality of weights in a second memory;
   using an output of said first memory to access said second memory; and
   multiplying an input signal by data output by said second memory.

* * * * *